United States Patent
Wang et al.

(10) Patent No.: US 6,516,952 B1
(45) Date of Patent: Feb. 11, 2003

(54) DUAL MODE SERIALIZER-DESERIALIZER FOR DATA NETWORKS

(75) Inventors: Peter Wang, Cupertino, CA (US); Ben Yunbei Yu, Fremont, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/312,068

(22) Filed: May 13, 1999

(51) Int. Cl.[7] .............................................. G06F 15/16
(52) U.S. Cl. ....................................... 209/227; 709/222
(58) Field of Search ................................. 709/222, 227, 709/232, 230, 236, 231; 710/71

(56) References Cited

U.S. PATENT DOCUMENTS 5,603,060 A * 2/1997 Weinberger et al. ............ 399/8
6,167,077 A * 12/2000 Ducaroir et al. ............ 375/219
6,446,192 B1 * 9/2002 Narasimhan et al. ......... 712/29

* cited by examiner

*Primary Examiner*—Zarni Maung
(74) *Attorney, Agent, or Firm*—Wagner, Murabito & Hao LLP (57) ABSTRACT

A method to switch a dual-mode serializer-deserializer for data networks. In one embodiment, the present invention recites a method for configuring the communication mode of a device having a Media Access Control-Physical Layer (MAC-PHY) interface for communicating with another device. One step receives a control signal at a device having a MAC-PHY Interface. The control signal indicating whether the device will communicate data over its data path in an aggregate mode or in a non-aggregate mode. In another step, the device is configured to communicate in the mode selected by said control signal. In another step, data is communicated over the data path of the device in a synchronous manner when the device is in an aggregate mode, and is communicated over the data path of the device in an asynchronous manner when the device is in a non-aggregate mode.

15 Claims, 6 Drawing Sheets

DUAL MODE SERIALIZER-DESERIALIZER FOR DATA NETWORKS

TECHNICAL FIELD

The present claimed invention relates to the field of communication devices in a network. Specifically, the present claimed invention relates to an apparatus and a method for providing a dual mode serializer-deserializer MAC-PHY level/interface for data network communication.

BACKGROUND ART

Computers and peripheral devices communicate to each other on a network through a communication port built into the device and through dedicated communication devices. Most communication port and devices utilize a seven-layered model referred to as the Open Systems Interconnection (OSI) standard that relates the digital logic signal from a device to the physical transmission medium used to transport the signal. The lower levels of the OSI relate the Media Access Control (MAC) layer and the Physical (PHY) layer. The MAC layer dictates the protocol to interpret the data communicated over a network while the PHY layer provides the physical medium used to communicate the data over the network.

The interface between the MAC and the PHY layer, e.g. the MAC-PHY interface, is important because it is essentially the first interface between the logical and the physical layers. Because it is the first layer, it's design and operation has a great effect on the balance of the system.

The PHY layer can consist of a plurality of physical channels linking two or more devices. When communicating over multiple physical channels, the MAC-PHY interface will always present a single data stream to the MAC. This can be accomplished in a number of ways. First, the multiple channels can be aggregated at a level below the MAC such that a single MAC receives a single stream of data that is aggregated from the synchronized multiple channels of data.

Figure 1A:
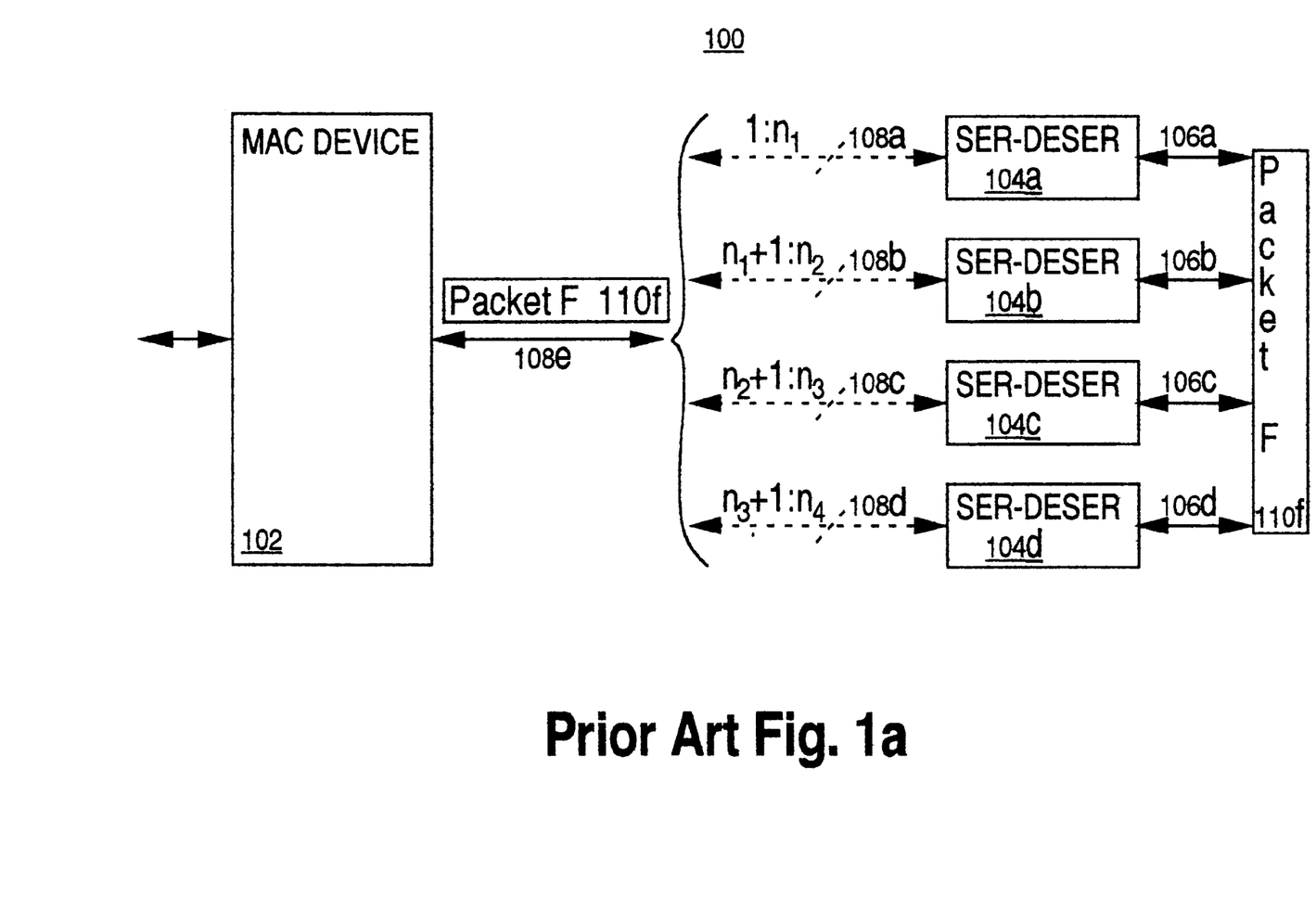
FIG. 1a is a conventional MAC-PHY interface for an aggregate mode of communication over a conventional multiple channel network.

A conventional MAC-PHY interface for an aggregate mode of communication over a conventional multiple channel network is shown in Prior Art FIG. 1a. In FIG. 1a, four data channels 106a, 106b, 106c and 106d are respectively coupled to four serializer-deserializer devices 104a, 104b, 104c, and 104d. The serializer-deserializer devices, in turn, are coupled to a single MAC device 102 via channels 108a, 108b, 108c, and 108d that are aggregated to present a single logical channel 108e to the MAC device 102. In this manner, a single data packet, e.g. packet F 110f, must be sent as synchronized parallel data over the multiple channels. This configuration is referred to as the aggregate mode of communication.

Figure 1B:
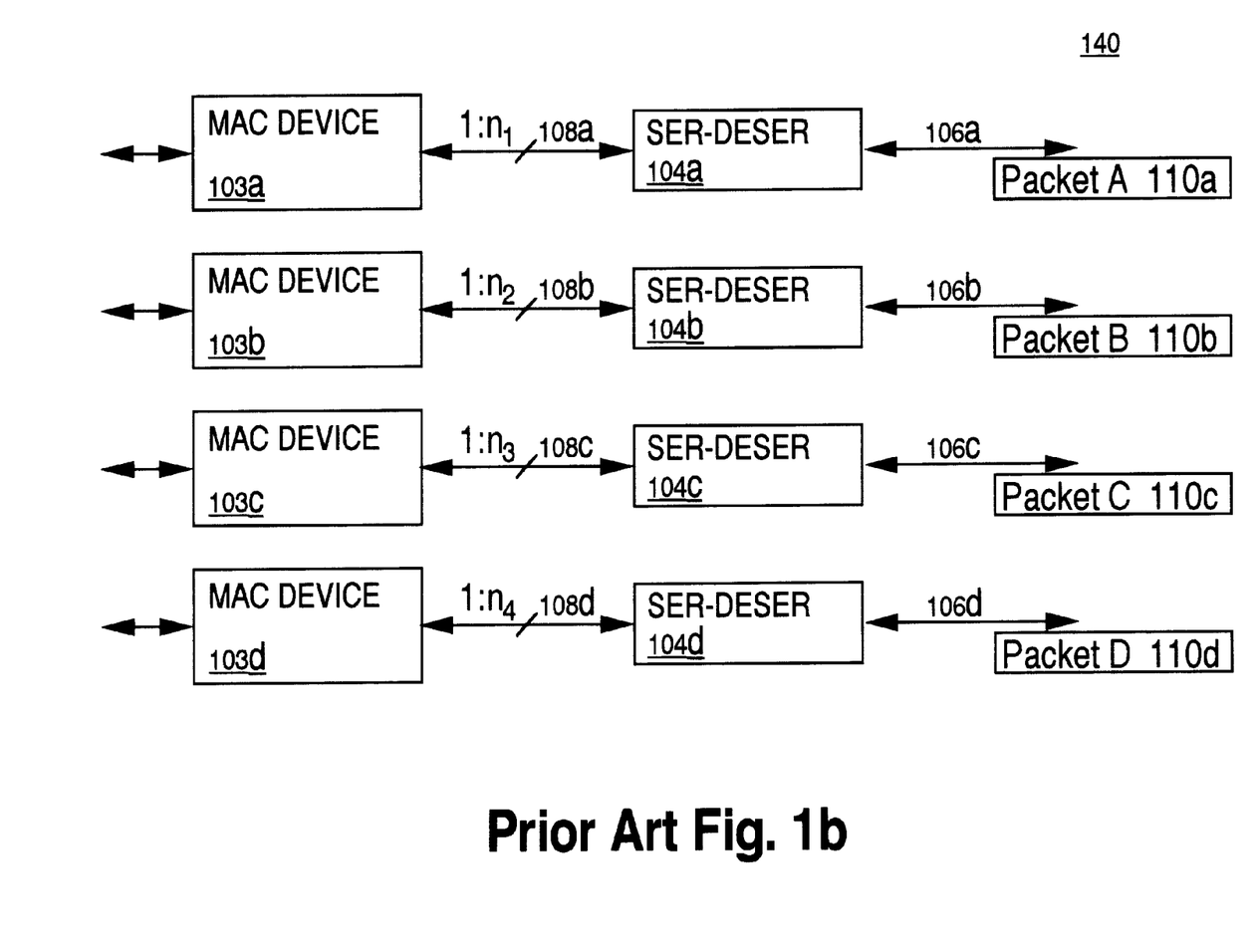
FIG. 1b is a conventional MAC-PHY interface for a non-aggregate mode of communication over a conventional multiple channel network.

Alternatively, a conventional MAC-PHY interface for a non-aggregate mode of communication over a conventional multiple channel network is presented in Prior Art FIG. 1b. In FIG. 1b, four data channels 106a, 106b, 106c and 106d are respectively coupled to four serializer-deserializer devices 104a, 104b, 104c, and 104d. The serializer-deserializer devices, in turn, are coupled to a respective MAC device 103a, 103b, 103c, and 103d via channels 108a, 108b, 108c, and 108d. In the non-aggregate mode of communication, each of the multiple channels 108a, 108b, 108c, and 108d have their own separate and independent PHY and MAC devices for asynchronously communicating data. In this manner, multiple data packets, e.g. Packet A 110a, Packet B 110b, Packet C 110c, and Packet D 110d, can be sent serially across a single respective channel, 106a, 106b, 106c, and 106d. Consequently, this configuration is referred to as a non-aggregated transmission mode because the data is aggregated at a level above the MAC layer, and thus the MAC-PHY layer sees non-aggregate data.

Unfortunately, conventional devices are built using hardware dedicated for either synchronous aggregate communication of one packet of data over multiple channels or asynchronous non-aggregate communication of multiple packets of data over multiple channels. Thus, a device configured for one mode could not operate on a system configured for another mode. For purposes of flexibility and universal operation, a need arises for a MAC-PHY interface that can operate in both an aggregated and a non-aggregated mode.

The aggregated communication mode has the benefits of transparent operation and optimal bandwidth utilization. Furthermore, it provides the lowest amount of latency for communicating data. However, if a failure occurs on one of the channels of a device configured for an aggregate mode of communication, the whole device will fail to communicate.

Alternatively, the non-aggregate communication mode has higher latency times because each data packet is transmitted in parallel over just one of the multiple channels. However, if a failure occurs on one of the channels of a device configured for a non-aggregate mode of communication, then a higher level of logic will compensate for this failure and successfully communicate on the balance of the channels. Hence, the non-aggregate communication mode has a much higher fault tolerance than the aggregate communication mode. Thus, both the aggregate and non-aggregate mode of communication have mutually exclusive strengths and weaknesses. Consequently, a need for a device to have the benefit of communicating in the aggregate mode while no communication faults exist and communicating in the non-aggregate mode when a fault arises. More specifically, there is a need for a device to have the option to switch between modes of communication to take advantage of the strengths of both communication modes.

In summary, a need exists for a method and apparatus for a MAC-PHY interface that can operate in both an aggregated and a non-aggregated mode. Also, a need exists for a method and apparatus for a device to have the benefit of aggregate communication while having the high fault tolerance of non-aggregate communication. More specifically, a need exists for a device to have the option to switch between modes of communication so as to take advantage of the benefits of both modes. The present invention provides a unique and novel solution that meets the above needs.

DISCLOSURE OF THE INVENTION

The present invention provides a method and apparatus for a MAC-PHY interface having dual mode serializer-deserializer that can be switched.

Specifically, in one embodiment, the present invention recites a method for configuring the communication mode of a device having a Media Access Control-Physical Layer (MAC-PHY) interface for communicating with another device. One step receives a control signal at a device having a MAC-PHY Interface. The control signal indicates whether the device will communicate data over its data path in an aggregate mode or in a non-aggregate mode. In another step, the device is configured to communicate in the mode selected by said control signal. In another step, data is communicated over the data path of the device in a synchronous manner when the device is in an aggregate mode, and data is communicated over the data path of the device in an asynchronous manner when the device is in a non-aggregate mode. By having the option to operate in a plurality of modes, the present invention has a more universal application over the conventional single-mode operation. Furthermore, the present invention offers the benefits of both modes in a single method. That is, the present invention offers both the preferred, e.g. aggregate, mode of communication along with the preferred fault-tolerance, e.g. non-aggregate, mode of communication.

In another embodiment, the present invention recites a dual-mode serializer/deserializer device capable of being coupled to, and communicating with, a communication network. The device is comprised of a reference clock source, a plurality of serializer/deserializer circuits, and a clock selection circuit coupling all three elements together. Each of the serializer/deserializer circuits has its own respective clock source. The clock-selection circuit, selectively couples each of the plurality of serializer/deserializer circuits to a reference clock source. The clock-selection circuit also selectively couples each of said serializer/deserializer circuits to its respective clock source. In this manner, the present invention provides a device with the option to switch between different modes of communication so as to take advantage of the benefits of both modes and avoid the disadvantages of both modes.

BRIEF DESCRIPTION OF THE DRAWINGS

The accompanying drawings, which are incorporated in and form part of this specification, illustrate embodiments of the invention and, together with the description, serve to explain the principles of the invention.

PRIOR ART

PRIOR ART

The drawings referred to in this description should be understood as not being drawn to scale except as specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions which follow (e.g., the processes) are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, terms such as "processing" or "computing" or "generating" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Network Linked Computer

Figure 2:
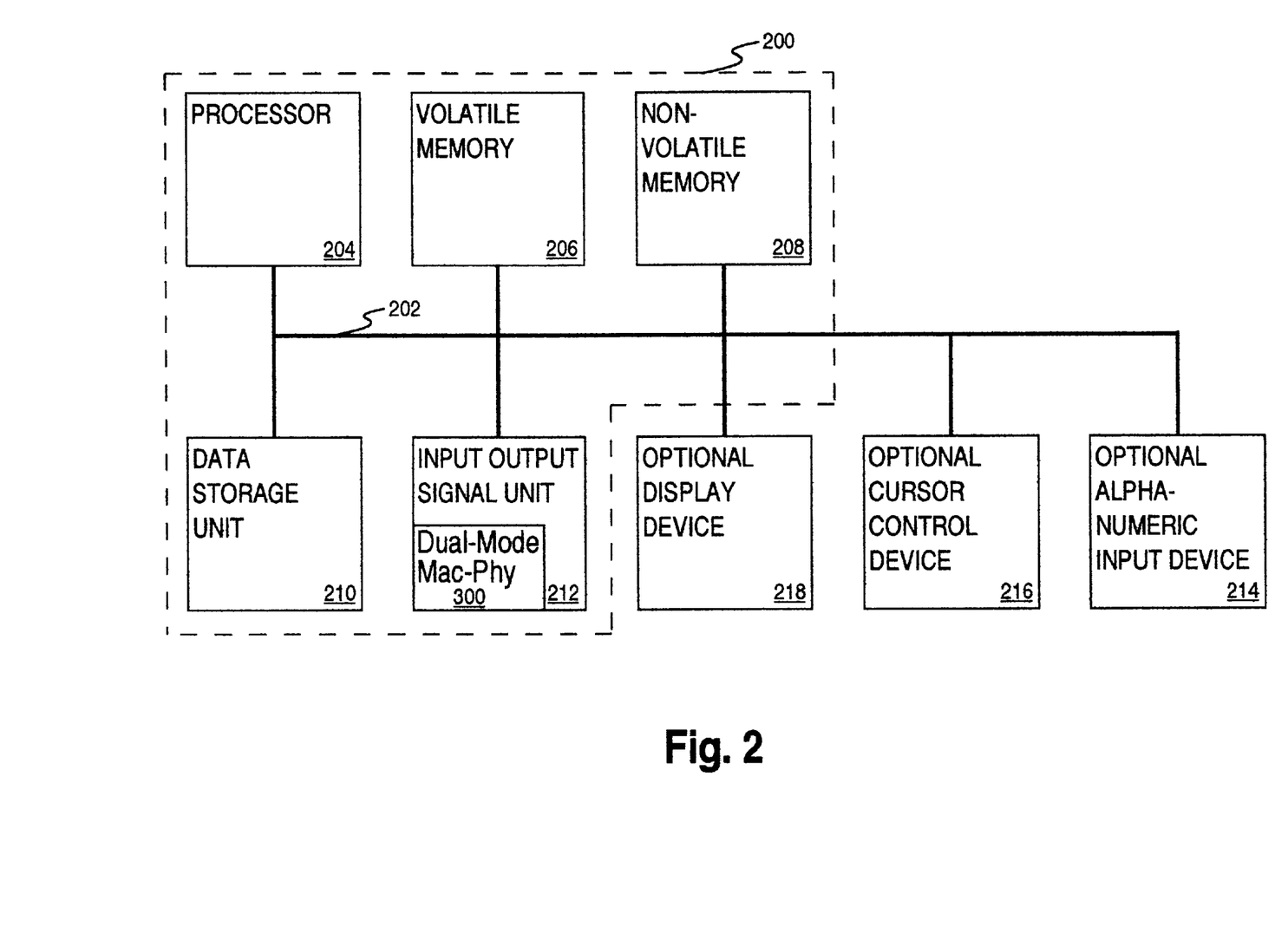
FIG. 2 shows a block diagram of a computer system incorporating a dual-mode MAC-PHY interface, in accordance with the present invention.

An exemplary computer system 200 incorporating a dual-mode MAC-PHY interface 300 is presented in FIG. 2. It is appreciated that exemplary computer system 200 is exemplary only and that the present invention can operate within a number of different computer systems including general purpose computer systems, embedded computer systems, and stand alone computer systems specially adapted for network operation.

System 200 of FIG. 2 includes an address/data bus 202 for communicating information, and a central processor unit 204 coupled to bus 202 for processing information and instructions. System 200 also includes data storage features such as a computer usable volatile memory 206, e.g. random access memory (RAM), coupled to bus 202 for storing information and instructions for central processor unit 204, computer usable non-volatile memory 208, e.g. read only memory (ROM), coupled to bus 202 for storing static information and instructions for central processor unit 204, and a data storage unit 210 (e.g., a magnetic or optical disk and disk and a disk drive) coupled to bus 202 for storing information and instructions.

An input output signal unit 212 (e.g. a modem or network interface card (NIC)) coupled to bus 202 is also included in system 200 of FIG. 2 to communicate with peripheral devices. Within the input output signal unit 212 is a dual-mode MAC-PHY interface 300. System 200 of the present intelligent power management interface also includes an optional alphanumeric input device 214 including alphanumeric and function keys, coupled to bus 202 for communicating information and command selections to central processor unit 204. System 200 also optionally includes a cursor control device 216 coupled to bus 202 for communicating user input information and command selections to central processor unit 204. System 200 of the present embodiment also includes an optional display device 218 coupled to bus 202 for displaying information.

Display device 218 of FIG. 2, may be a liquid crystal device, cathode ray tube, or other display device suitable for creating graphic images and alphanumeric characters recognizable to a user. Optional cursor control device 216 allows the computer user to signal the two dimensional movement of a visible symbol (cursor) on a display screen of display device 218. Many implementations of cursor control device 216 are knowing the art including a trackball, mouse, touch pad, joystick or special keys on alphanumeric input device 214 capable of signaling movement of a given direction or manner of displacement. Alternatively, it will be appreciated that a cursor can be directed and/or activated via input from alphanumeric input device 214 using special keys and key sequence commands. The present invention is also well suited to directing a cursor by other means such as, for example, voice commands.

While the present embodiment provides a computer system 200 as the device incorporating a MAC-PHY interface, the present invention is also well suited to any kind of device that will communicate on a network, such as a router, switch, etc.

Dual-Mode MAC-PHY Interface

Figure 3:
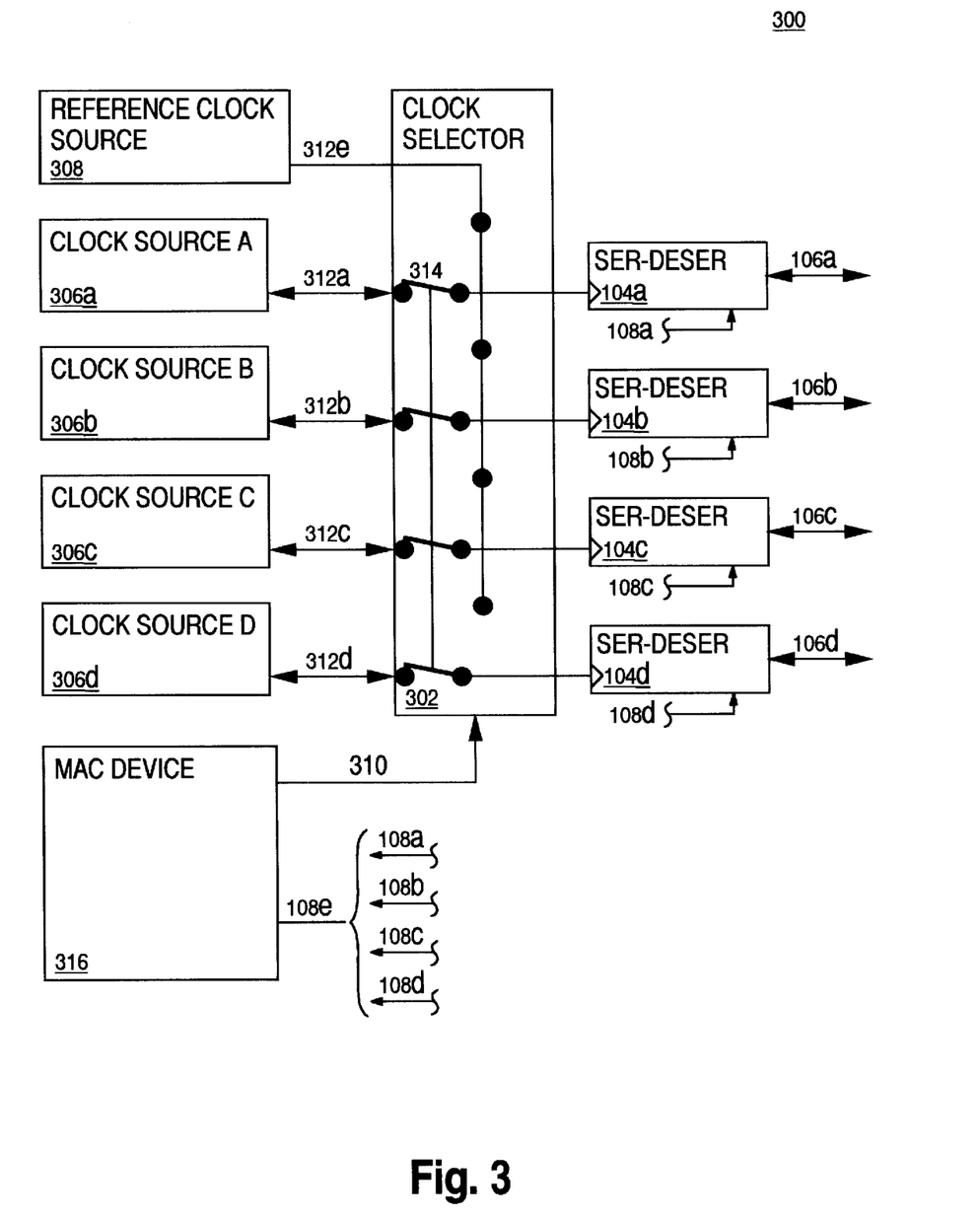
FIG. 3 shows a block diagram of a dual-mode MAC-PHY interface, in accordance with the present invention.

A block diagram of a dual mode MAC-PHY interface 300 is presented in FIG. 3 as one embodiment of the present invention. The MAC-PHY interface 300 in the present embodiment is comprised of independent clock sources 306a, 306b, 306c, and 306d coupled, via leads 312a, 312b, 312c and 312d, to a clock selector 302 for selective coupling, via switch 314, to a respective serializer-deserializers 104a, 104b, 104c, and 104d. Similarly, a reference clock source 308 is coupled to clock selector 302, via lead 312e, for selective coupling, via switch 314, to all of the serializer-deserializers 104a, 104b, 104c, and 104d. When coupled to the reference clock, serializer-deserializers 104a, 104b, 104c, and 104d communication is synchronized to a single clock source. Serializer-deserializers 104a, 104b, 104c, and 104d are subsequently coupled to a respective data communication channel 106a, 106b, 106c, and 106d for communicating data over a network. Serializer-deserializers 104a, 104b, 104c, and 104d are also coupled to a MAC device 316 via links 108a, 108b, 108c, and 108d.

The clock selector is also coupled to MAC 316 via a lead 310. Lead 310 is used to communicate a control signal from MAC 316 to clock selector circuit 302. With this lead 310, the MAC can configure the communication mode of MAC-PHY interface 300. Although not illustrated, an alternative embodiment could utilize multiple MAC devices to accommodate the non-aggregate mode of communication with the MACPHY interface 300. In this alternative embodiment, any one of the multiple MAC devices could be coupled clock selector circuit 302 for providing the control signal to clock selector circuit 302.

While the present embodiment illustrates a quantity of four channels 106a, 106b, 106c, and 106d for communication, the present invention is well suited to any quantity of multiple channels. Likewise, while the present embodiment illustrates clock selector 302 as using a mechanical switch 314 to change clock signals from reference clock source 308 to independent clock sources 306a, 306b, 306c, and 306d, it is done so primarily for illustration purposes. Consequently, the present invention is well suited to electronic switching. Finally, while the present embodiment illustrates independent clock sources 306a, 306b, 306c, and 306d independently driving the respective serializer-deserializers 104a, 104b, 104c, and 104d, a forwarded clock from a MAC 316, or any source, could also be used. Any clock can be used to drive the respective serializer-deserializers 104a, 104b, 104c, and 104d, on leads 312a, 312b, 312c and 312d because synchronization is not required for this coupling that represents the non-aggregate communication mode. The steps for performing the configuring of a dual-mode MAC-PHY interface is addressed hereinafter.

Method of Configuring a Dual-Mode MAC-PHY Interface

Figure 4A:
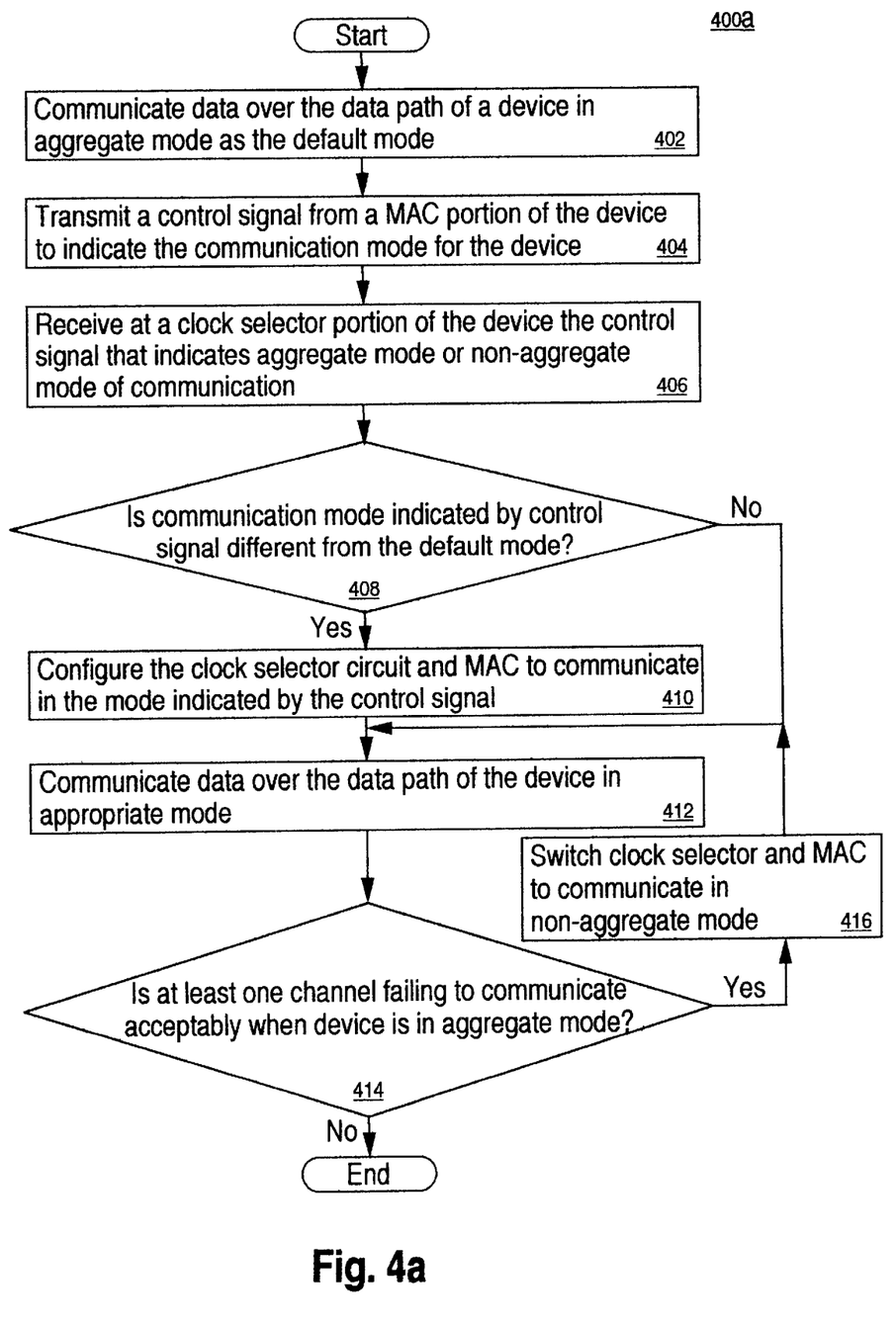
FIG. 4a is a flow chart of the steps that a device performs to configure the communication mode of a dual-mode MAC-PHY interface, in accordance with one embodiment of the present invention.

A flow chart 400a of the steps performed to configure the communication mode of a dual-mode MAC-PHY interface is presented in FIG. 4a. The steps provided in FIG. 4a provide the benefit of allowing the MAC-PHY interface to be used on a network having an aggregate mode or a non-aggregate mode of communication. The steps presented in flowchart 400 will be described with reference to hardware illustrated in FIG. 3 and described hereinabove.

In step 402, data is communicated over the data path of a device in the aggregate mode as the default mode. In this embodiment, the preferred communication mode is the aggregate mode. As previously noted, the aggregate mode provides optimal bandwidth utilization and the lowest latency in data transfer. Alternatively, the non-aggregate mode may be used as the default mode. As illustrated in FIG. 3, switch 314 would be in a position such that serializer-deserializer 104a, 104b, 104c, and 104d would be coupled to the reference clock source 308. In the aggregate mode, a single data packet, Packet F 110f, would be transmitted simultaneously and in a synchronized fashion over leads 106a, 106b, 106c, and 106d.

In step 404 a control signal is transmitted from a MAC portion of the device to indicate the communication mode for the device. The MAC indicates the communication mode because the MAC is the component that receives the control signal from a user or the network that indicates the desired communication mode. As illustrated in FIG. 3, MAC device 316 would transmit a control signal via lead 310 to clock selector 302. In this manner, the MAC and the clock selector would operate consistently in the desired mode because their modes are linked together. MAC-PHY interface 300 could operate with one MAC device 316, as indicated in the present embodiment. Alternatively, it could operate with a plurality of MAC devices, one for each channel. In the latter case, the plurality of MAC devices would be linked together so that they would all communicate in the same mode, and any one of the plurality of MAC devices could communicate the control signal to the clock selector.

In step 406 a clock selector portion of the device receives the control signal that indicates whether the aggregate mode or the non-aggregate mode of communication is to be used. As illustrated in the hardware of FIG. 3, clock selector 302 would receive a control signal via lead 310. The control signal would indicate whether clock-selector would operate in the aggregate mode or the non-aggregate mode of communication.

In step 408, a question block asks whether the communication mode indicated by the control signal is different from the default communication mode. This question arises because the default mode can be overridden as desired. If the control signal indicates a mode the same as the default mode, then flowchart 400a proceeds to step 412. if the control signal indicates a mode different from the default mode, then flowchart 400a proceeds to step 410. This step manifests the benefit of the present invention's dual-mode MAC-PHY device having the option to switch between modes of communication. With this benefit, the present invention can take advantage of the benefits of both modes, e.g. bandwidth utilization and high fault-tolerance, and the flexibility to operate in two different communication environments.

In step 410, the clock selector portion of the device and the MAC is configured to communicate via the mode indicated by the control signal. As illustrated in FIG. 3, switch 314 would be placed in the position appropriate for the type of communication. For example, in the aggregate mode of communication, switch 314 would be positioned such that it coupled reference clock source 308 to serializer-deserializers 104a, 104b, 104c and 104d. Alternatively, in the non-aggregate mode of communication, switch 314 would be positioned such that it coupled independent clock source A 306a, source B 306b, source C 306c, and source D 306d to their respective serializer-deserializer 104a, 104b, 104c, and 104d. As indicated earlier, the present invention contemplates alternative clock sources and coupling that would accomplish the same communication mode requirements. In this manner, the present embodiment has the ability to be configured in two modes, the aggregate mode and the non-aggregate mode.

In step 412, the data is communicated over the data path of the device in the appropriate mode. Because MAC 316 and serializer-deseriailzers 104a, 104b, 104c, and 104d are linked via clock selector 302, they communicate harmoniously in either the aggregate or non-aggregate mode. Consequently, the present invention provides a flexible device that can be used on different communication networks.

In step 414, a question block asks whether at least one channel is failing to communicate acceptably when the device is in the aggregate mode. This question arises because a failure on one channel for the aggregate mode prevents all the channels from communicating. If at least one channel fails to communicate acceptably, then flowchart 400a proceeds to step 416. If all channels are communicating acceptably, then flowchart 400a ends. It is understood that the flowchart, when applied in one embodiment, repeats itself in a continuous and parallel fashion.

In step 416, the clock selector is switched from the aggregate mode to the non-aggregate mode. In this manner, the present embodiment provides a solution for the failure mode, thereby allowing communication to continue, but in a different mode, the non-aggregate mode. This step provides the benefit a MAC-PHY interface with greater fault-tolerance. When the chosen or the default communication mode is the aggregate mode, having low fault-tolerance, and a failure occurs, the present embodiment provides the option to switch the MAC-PHY interface to the more robust and fault-tolerant non-aggregated mode. The non-aggregate mode would allow multiple data packet, Packet A 110a, Packet B 110b, Packet C 110c, and Packet D 110d, to be transmitted simultaneously and in a non-synchronized fashion over leads 106a, 106b, 106c, and 106d. After step 416, flowchart 400a proceeds to step 412.

As an example of step 416 as applied to the hardware illustrated in FIG. 3, assume that channel 106a has a problem communicating data. The problem could be in serializer-deserializer 104a or in a mating device located on the other end of channel 106a. Regardless of the source of the communication fault, the fact that a fault exists while MAC-PHY interface 300 is communicating in the aggregate mode means that the entire data path, comprised of all channels 106a, 106b, 106c, and 106d, will fail to communicate. This is because the MAC layer is trying to send out or receive a single packet of data that is split up over four channels. If one of the channels is not communicating acceptably, then the data transmitted or received is flawed because parts of the data are missing. As a solution, the present embodiment would switch clock selector 302 and MAC, e.g. 316, to communicate in the non-aggregate mode. In the non-aggregate mode, the MAC transmits data, e.g. a separate packet of data, on each channel independently of the other channels. In this manner, three channels can transmit three packets of data independently while the faulty fourth channel remains idle. Consequently, communication can occur at 75% capacity in the non-aggregate mode rather than 0% capacity in the aggregate mode.

Figure 4B:
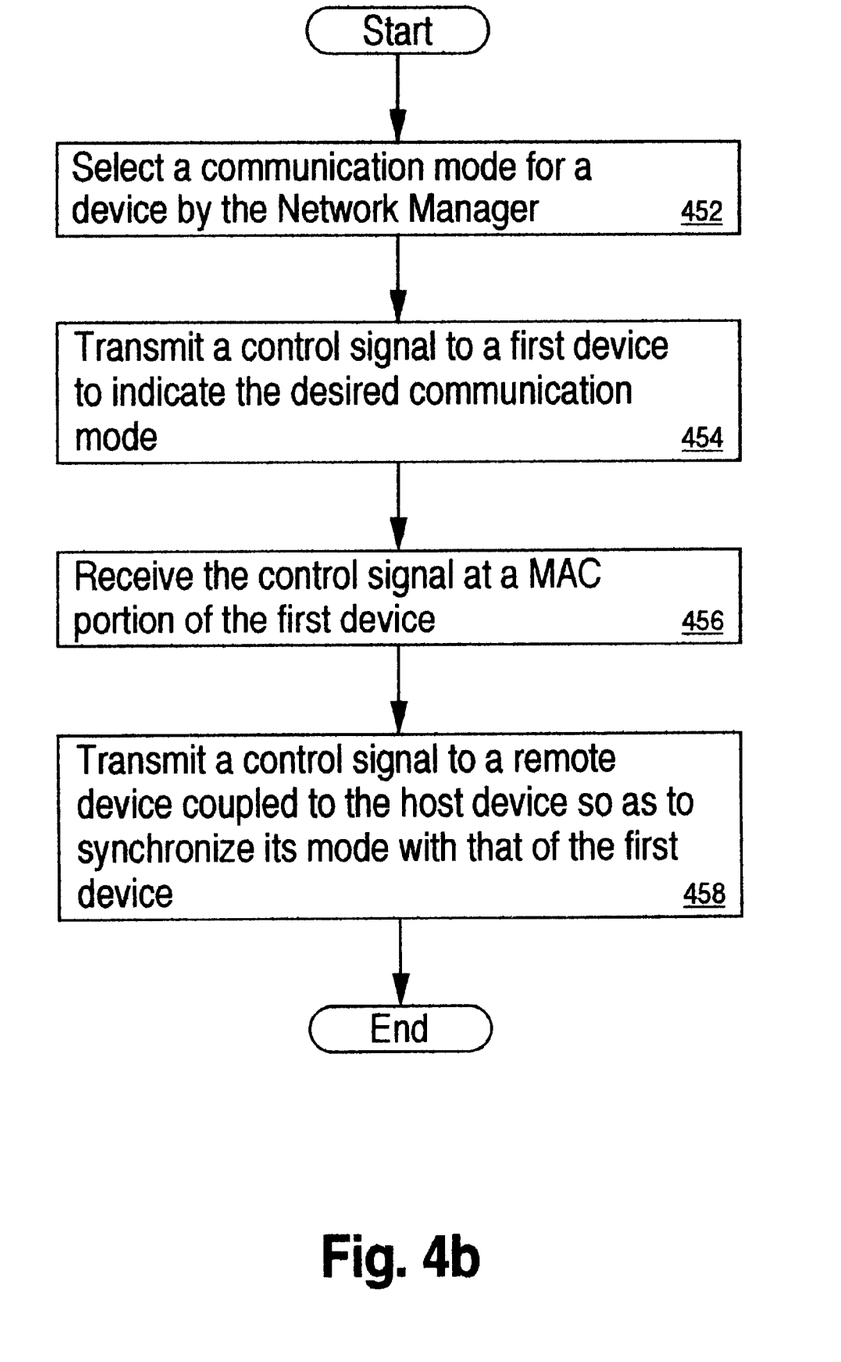
FIG. 4b is a flow chart of the steps that a communication network performs to configure the communication mode of a dual-mode MAC-PHY interface in a device, in accordance with one embodiment of the present invention.

A flow chart 400b of the steps performed to configure the communication mode of a dual-mode MAC-PHY interface in a communication network is presented in FIG. 4b. The steps provided in FIG. 4b provide the benefit of allowing the MAC-PHY interface to be used on a network having an aggregate mode or a non-aggregate mode of communication. The steps presented in flowchart 400 will be described with reference to hardware illustrated in FIG. 3 and described hereinabove.

In step 452, a Network Manager selects a communication mode for a device. While the present embodiment indicates that a Network Manager selects the communication mode, the present invention is well suited to other sources for selecting the communication mode, such as a predetermined protocol, a user, etc.

In step 454, a first control signal is transmitted to a first device indicating the desired communication mode. Hence, regardless of what entity selected the mode in step 452, the first control signal must be communicated to the first device to activate the appropriate mode.

In step 456, a MAC portion of the first device receives the first control signal. At this point, the method of configuring the communication mode reverts to the device level operation, as illustrated in FIG. 4a. While the present embodiment utilizes a MAC portion of the first device to receive the first control signal, the present invention is also well suited to using an alternative layer of the OSI. By utilizing the present embodiment, the present invention is able to configure the communication mode of the first device on a network. Consequently, the device has greater value in that it can be interfaced on networks and devices having different communication modes. Furthermore, improved fault tolerance can be obtained by having the ability to switch a device from a communication mode having a low fault tolerance to a communication mode having a high fault tolerance.

Finally, in step 458, the MAC portion of the first device sends a second control signal to a second device, such as a remote device, on the other end of the link indicating the change of mode. The remote devices can achieve mode-synchronization by executing steps of FIG. 4*a*. While the present embodiment uses the first device to send the second control signal to the remote devices, alternative devices and protocols can be used to indicate the selected mode of communication so as to synchronize the mode of communication between the devices.

In conclusion, the present invention provides a method and apparatus for a MAC-PHY interface that can operate in both an aggregate and a non-aggregate communication mode. Also, the present invention provides a method and apparatus having the benefit of aggregate communication while having the high fault tolerance of non-aggregate communication. More specifically, the present invention provides an apparatus the option to, and a method for, switching between modes of communication so as to take advantage of the benefits of both modes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. In a first device having a media access control-physical layer (MAC-PHY) interface for communicating with a second device, a method for configuring a communication mode of said first device, said method comprising the steps of:

receiving a control signal at said first device having said MAC-PHY interface, wherein said control signal controls whether said first device communicates in either an aggregate mode or in a non-aggregate mode;

configuring said first device for said communication mode selected by said control signal; and communicating data with said second device in a synchronous manner when said first device is in said aggregate mode, and communicating data with said second device in an asynchronous manner when said first device is in said non-aggregate mode.

2. The method as recited in claim 1 wherein said control signal is received at a clock selector of said first device, and wherein said first device has at least one serializer/deserializer circuit coupled to said clock selector of said first device.

3. The method as recited in claim 2 wherein said step of configuring said first device is comprised of:

configuring said clock selector of said first device and a media access control (MAC) of said first device to communicate in said communication mode selected by said control signal.

4. The method as recited in claim 1 wherein said control signal is transmitted from a media access control (MAC) of said first device.

5. The method as recited in claim 1 further comprising the step of:

transferring data, in response to said control signal requesting communication in said aggregate mode, over a plurality of serializer/deserializer circuits of said first device by using a first clock circuit as a master circuit to supply a synchronized clock signal to said plurality of serializer/deserializer circuits.

6. The method as recited in claim 1 further comprising the step of:

transferring data, in response to said control signal requesting communication in said non-aggregate mode, over at least one serializer/deserializer circuit of said first device by using an independent clock signal for each of said at least one serializer/deserializer circuit.

7. The method as recited in claim 6 wherein each of said at least one serializer/deserializer circuit will transfer data asynchronously and independently from each other, will encode data asynchronously and independently from each other, and will correct errors asynchronously and independently from each other.

8. The method as recited in claim 1 further comprising the steps of:

transferring data over a plurality of serializer/deserializer circuits in an aggregate mode as a default mode; and switching said clock selector circuit and a MAC portion of said first device to operate in a non-aggregate mode when communication fails to be acceptable on at least one of said plurality of serializer/deserializer circuits.

9. A dual-mode serializer/deserializer device capable of being coupled to, and communicating with, a communication network, said device comprising: a reference clock source;

a plurality of serializer/deserializer circuits, each of said serializer/deserializer circuits having its own respective clock source; and a clock-selection circuit, said clock-selection circuit selectively coupling each of said plurality of serializer/deserializer circuits to said reference clock source, and said clock-selection circuit selectively coupling each of said serializer/deserializer circuits to its said respective clock source.

10. The device recited in claim 9 wherein said device further comprises:

a MAC circuit, said MAC circuit controlling said clock-selection circuit, wherein said clock-selection circuit selects a mode in which said device communicates.

11. The device recited in claim 9 wherein said respective clock source for each of said plurality of serializer/deserializer circuits is a respective external clock crystal.

12. The device recited in claim 9 wherein said respective clock source for each of said plurality of serializer/deserializer circuits is a forwarded clock from a Media Access Control (MAC) portion of said device.

13. The device recited in claim 9 wherein said clock-selection circuit has an input for a mode selection signal.

14. In a communication network communicatively coupling a plurality of devices, each device having a dual-mode serializer/deserializer for communicating on a network, a method for configuring a communication mode of one of said plurality of devices, said method comprising the steps of:

receiving a first control signal by a first device, said first device selectively communicating in an aggregate and a non-aggregate mode, said control signal indicating whether said first device should communicate data over a data path in an aggregate mode or an non-aggregate mode; and transmitting data across said network by said first device in said selected mode, said transmission performing as a single, synchronous channel for said aggregate mode and said transmission performing as multiple, independent, asynchronous channels for said non-aggregate mode.

15. The method recited in claim 14 further comprising the step of:

transmitting a second control signal by said first device to a second device coupled to said first device, said second control signal synchronizing a communication mode of said second device to said mode selected by said first control signal for said first device.

* * * * *